April 5, 1927.

W. M. MITCHELL 1,623,695

SPEED CHANGE MECHANISM

Filed Sept. 17, 1925

WITNESSES

INVENTOR
W. M. Mitchell
BY
ATTORNEYS

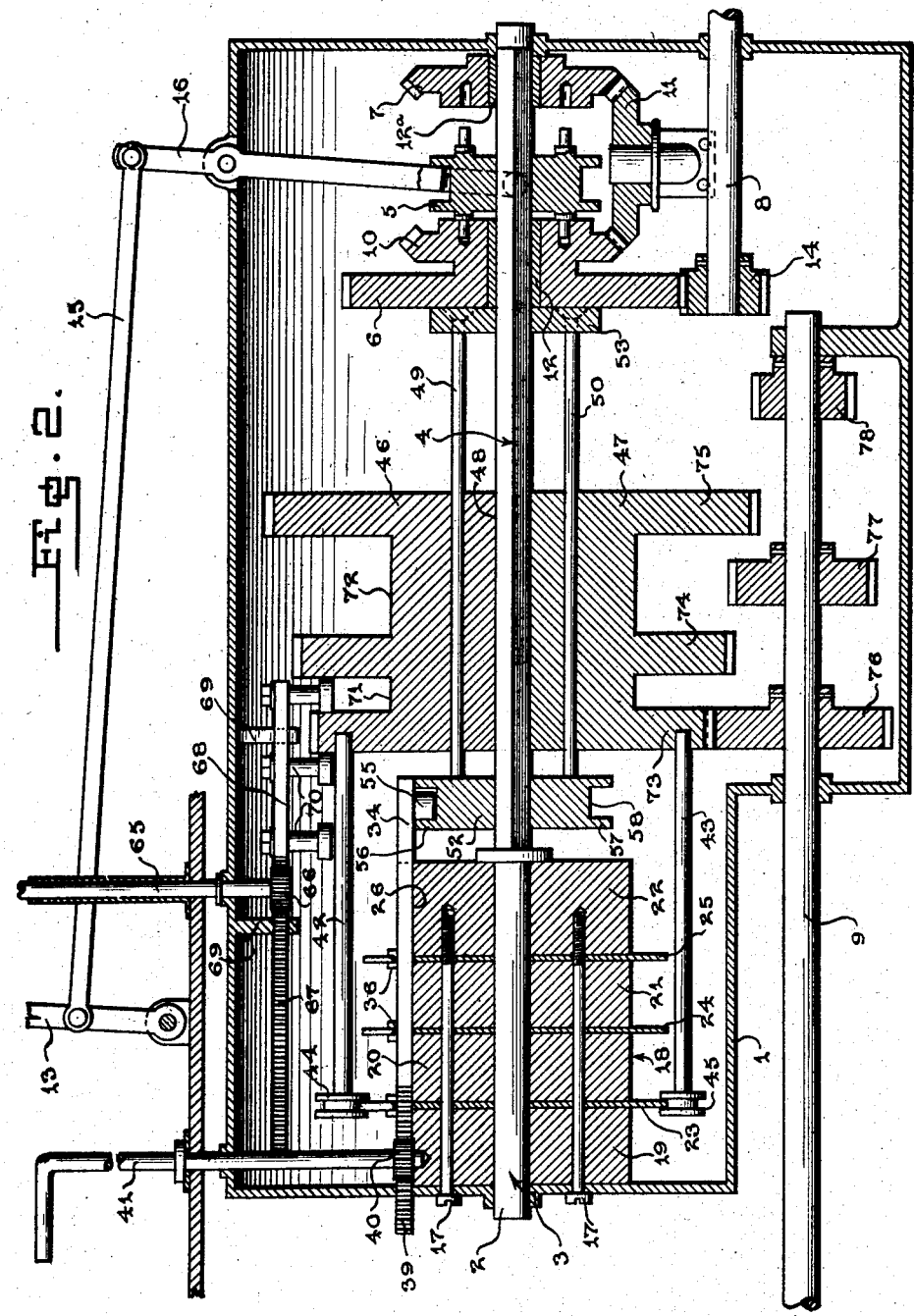

April 5, 1927.
W. M. MITCHELL
SPEED CHANGE MECHANISM
Filed Sept. 17, 1925
1,623,695
4 Sheets-Sheet 3
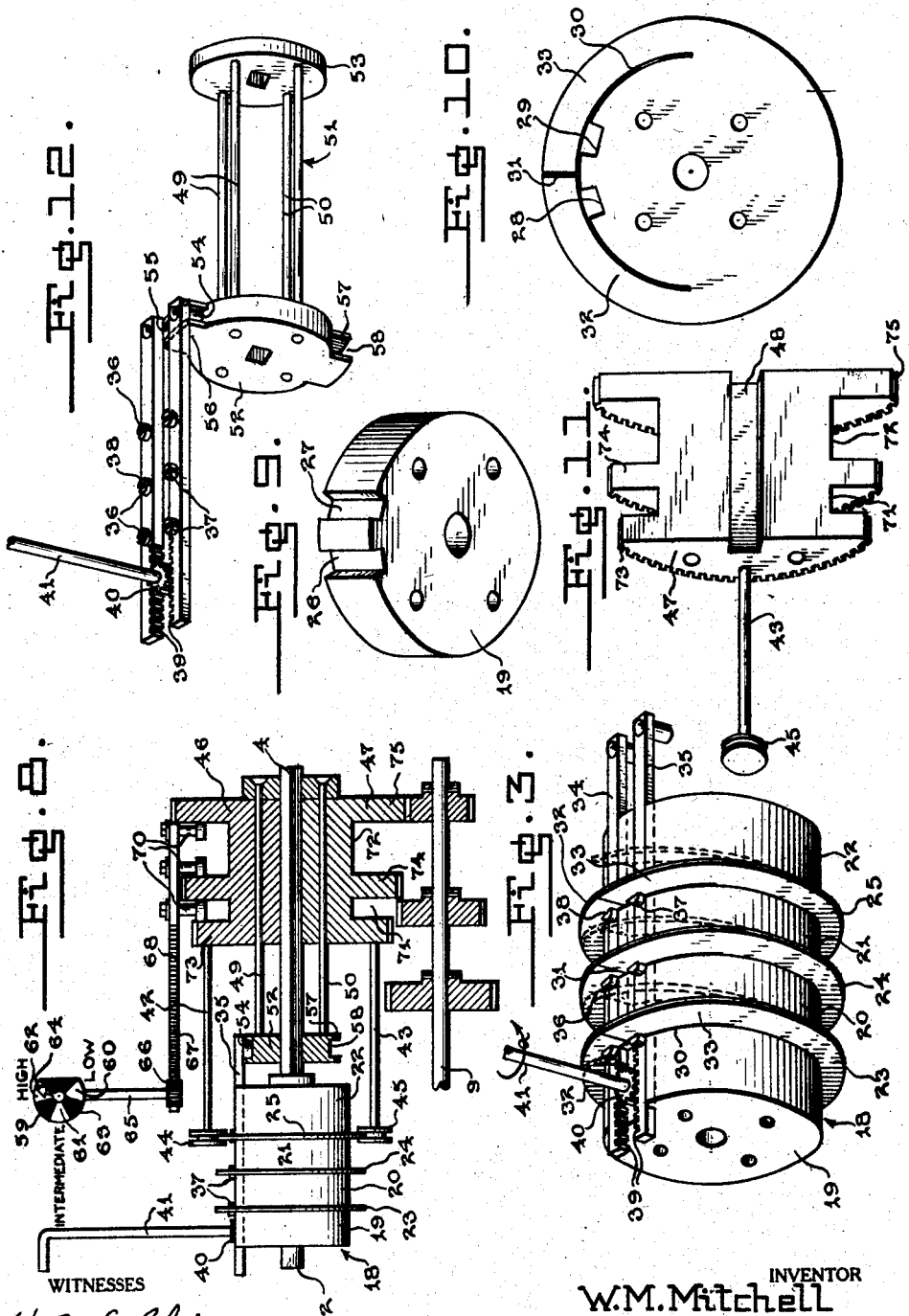
WITNESSES
INVENTOR
W. M. Mitchell
BY
ATTORNEYS

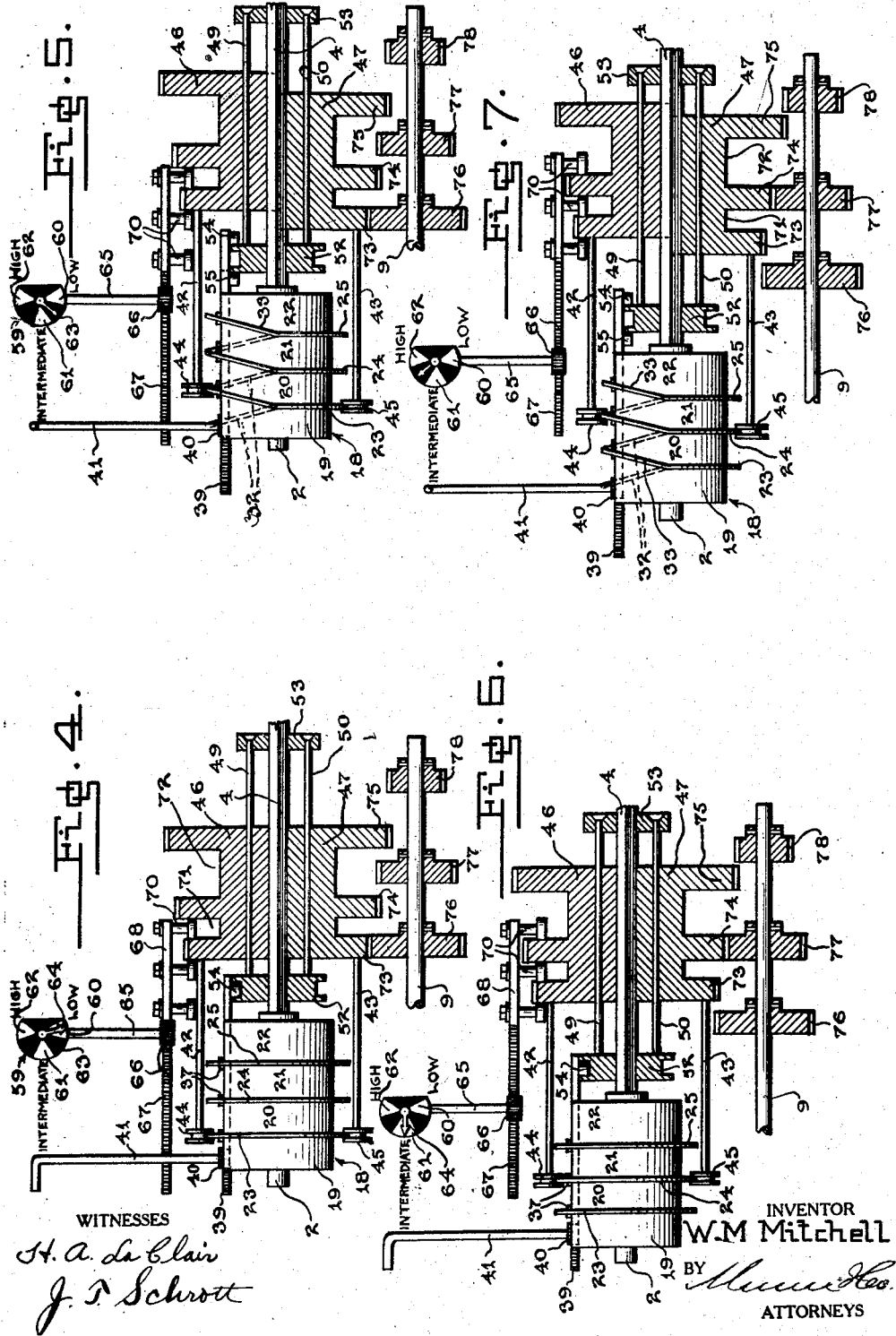

Patented Apr. 5, 1927.

1,623,695

UNITED STATES PATENT OFFICE.

WILLIAM MINOR MITCHELL, OF GRENADA, MISSISSIPPI.

SPEED-CHANGE MECHANISM.

Application filed September 17, 1925. Serial No. 56,971.

This invention relates to improvements in mechanism commonly referred to as gear shift mechanism, and it consists of the constructions, combinations and arrangements herein described and claimed.

An object of the invention is to provide a speed change mechanism or gear shifter designed in such a manner that shifting may be done from one speed to another while the motor vehicle or other machinery is in motion and without requiring that the engine be disconnected or released, as is now the custom.

Another object of the invention is to provide a mechanism of the character described in which the speed changes are made by a novel arrangement of split gears, an associated speed change indicator furnishing the operator with information as to the exact condition of the split gears so that he may not attempt manipulation of the shift lever at an inappropriate time.

Other objects and advantages appear in the following specification, reference being had to the accompanying drawings, in which—

Figure 2 is a central longitudinal section of the mechanism, again in low gear.

Figure 3 is a detail perspective view of the track assembly.

Figure 4 is a sectional diagram showing the parts in low gear.

Figure 5 is a diagram illustrating the act of shifting from low to intermediate gear.

Figure 6 is a diagram illustrating the position of the parts after intermediate gear has been reached.

Figure 7 is a diagram illustrating the act of shifting from intermediate to high gear.

Figure 8 is a diagram illustrating the position of parts when in high gear.

Figure 9 is a detail perspective view of one of the track assembly cylinders.

Figure 10 is a side elevation of one of the track discs.

Figure 11 is a detail perspective view of one of the split gear blocks.

Figure 12 is a detail perspective view of the shift rods and gear block carriage.

Figure 1:
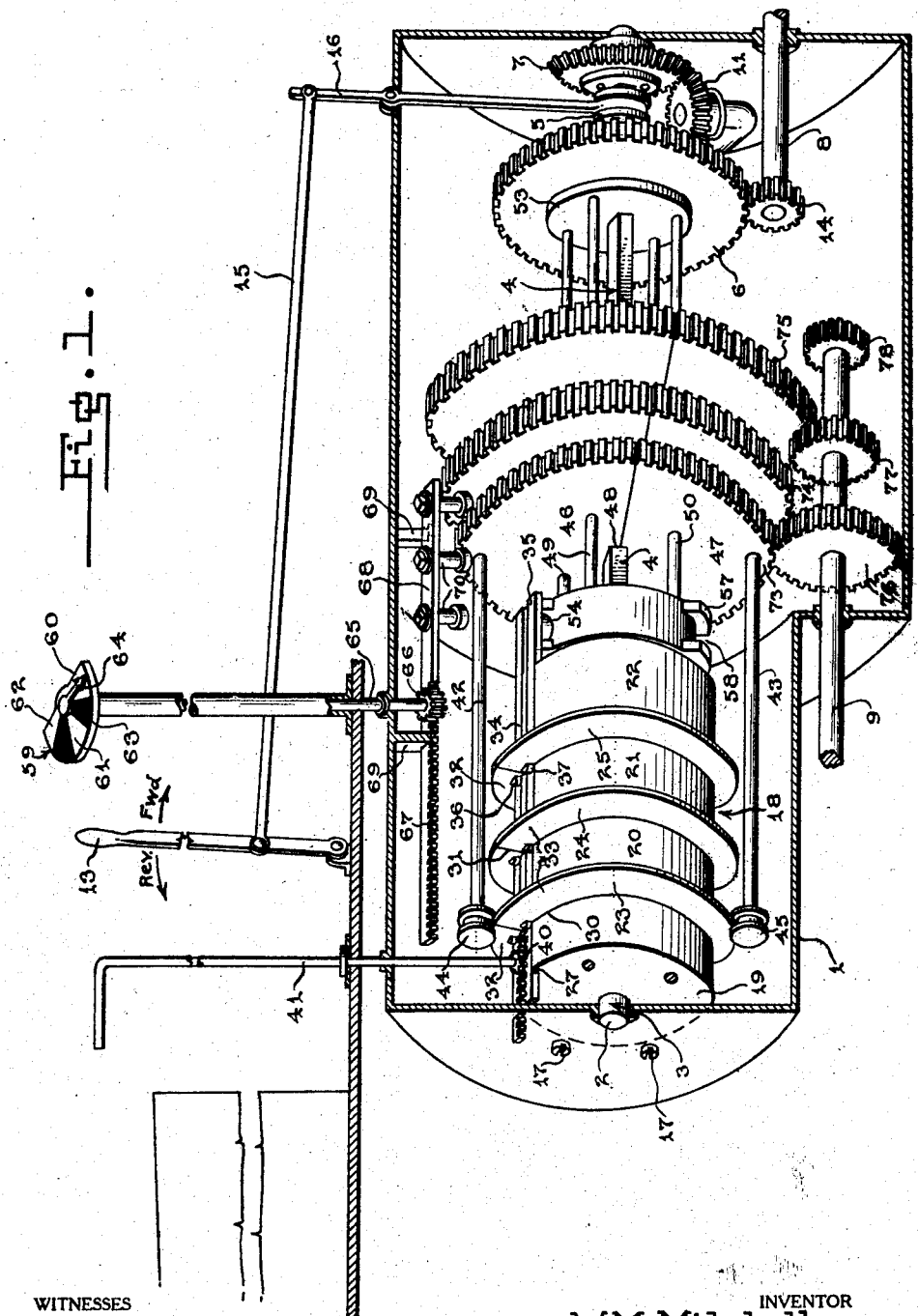
Figure 1 is a sectional perspective view of a speed change mechanism constructed in accordance with the invention, the mechanism being in low gear.

Situated in the transmission case 1 is the countershaft 2 which is round at 3 and non-circular at 4. The counter-shaft rotates continuously when the cluth 5 (see Figures 1 and 2) is shifted either into engagement with the driven gear 6 or the driven pinion 7. Motion is derived from the crank shaft 8 of the engine (not shown) and power is taken off at the transmission shaft 9 which extends to differential gearing (not shown) at the rear.

The driven gear 6 has a pinion 10 which meshes with an idler 11. The gears 6 and 7 are loose upon the shaft 2 and are revoluble upon sleeves 12 and 12ª. Both gears revolve continuously but in opposite directions. Upon shifting the clutch lever 13 forwardly the clutch 5 is moved into engagement with the gear 6. The gear 6 is then secured to the countershaft so that the crank shaft 8 drives the countershaft by means of the drive pinion 14. Upon shifting the lever 13 rearwardly the clutch 5 is brought into engagement with the driven pinion 7 so that the direction of turning of the countershaft 2 is reversed. The movements of the lever 13 are transmitted by means of a link 15 to the clutch fork 16. A pedal (not shown) may be substituted for the lever 13.

Secured in the transmission case 1 by means of bolts 17 so that it can not move in any respect is the track assembly 18 (Figs. 1 and 3) so called because it is composed of an assembly of cylinders 19, 20, 21 and 22 and track disks 23, 24 and 25. The various disks in the order named and shown, are representative of first, second and third speeds. The reverse speed is handled by the clutch lever 13, and the motor vehicle may be driven in reverse at any one of the three speeds provided for.

One of the cylinders 19 is shown in detail in Figure 9. All four are alike. The cylinder has a pair of grooves 26 and 27. A detail of one of the three track disks is shown in Figure 10. The disk 23 is made of relatively thin spring steel or brass, being provided with grooves 28 and 29 matching the grooves 26 and 27 when assembled. The disk also has a semi-circular cut 30 producing a portion of metal which, after division in the center as at 31 provides a pair of tongues 32 and 33. Upon fitting the various cylinders and disks together (Figs. 1 and 2) the resulting track assembly discloses a pair of continuous grooves in the top.

Shift rods 34 and 35 occupy the grooves. The shift rods are held in place by virtue of the fact that they pass under the tongues 32 and 33 of the various track disks. It is observed that the track disks are of a diameter greater than the adjacent cylinders 19, 20, etc. The arrangement leaves the tongues 32 and 33 exposed at the periphery of the cylinders. The tongues 32 and 33 being flexible and free to the extent of 180° of the circumference of the respective track disks are capable of being bent out of circumferential alignment by means of the shift rods 34 and 35. Upon such occurrence the track disks assume the dotted line positions in Figure 3, presenting in part the appearance of a spiral.

For the purpose of bending the tongues 32 and 33 of the track disks, the shift rods 34 and 35 each carry a set of three shift pins 36 and 37 (Fig. 12). These are split at 38 to receive the ends of the tongues. The shift rods are provided with racks 39 in confronting locations. A shift pinion 40 meshes with the racks. The pinion is carried by a shift lever 41 which has bearing both upon the first cylinder 19 and in other parts of the structure terminating in a handle accessible by the operator. Upon turning the shift lever in the counter-clockwise direction, (arrow $a$, Fig. 3) the shift rod 35 is made to move forwardly and the shift rod 34 rearwardly. The extremity of the tongue 33 of disk 23 is then brought into alignment with the extremity of tongue 32 of disk 24. The same is true of the disk 24 in respect to the disk 25. The result is the provision of a cross-over track from one disk to the other. The arrangement resembles a spiral as designated by dotted lines (Fig. 3).

A pair of guide rods 42 and 43 have flanged rollers 44 and 45 riding upon one of the track disks. When the mechanism is adjusted for low speed, the rollers ride upon the low speed track disk 23. When the tongues are bent as previously described, the rollers 44 and 45 will ride upon the resulting cross over track to the second disk 24 upon which disk they will subsequently ride while the mechanism stands in second speed position. Similarly, the rollers are capable of riding across and upon the disks 25 when the mechanism stands in the high speed position. It is by means of this riding of the rollers 44 and 45 that the guide rods are either shifted longitudinally or made to occupy predetermined positions.

The longitudinal movements of the guide rods 42 and 43 are solely for the purpose of shifting the gear blocks 46 and 47. These blocks are made in halves (Fig. 11). They have central grooves 48 corresponding with the non-circular portion 4 of the countershaft so that they are compelled to turn with the counter-shaft but at the same time are capable of longitudinal sliding movement when demanded by the guide rods. The ends of the guide rods are fixed in the gear blocks, and the guide rods move with the gear blocks during rotation. It is then that the rollers 44 and 45 ride upon the stationary track disks.

Pairs of rods 49 and 50 provide parts of a gear carriage 51 (Fig. 12) upon which the gear blocks ride. The ends of these rods are respectively fixed in a lock disk 52 and in an end disk 53. The arrangement produces a rigid carrying structure which not only supports the gear blocks in proper relationship but provides an adequate carriage upon which they may ride. The gear blocks have holes through which the pairs of carriage rods pass. The gear carriage is revoluble with the countershaft but is incapable of longitudinal movement.

Provision is made for the prevention of operation of the shift lever 41 while the rollers 44 and 45 are traversing the space between track disks during the shifting of the gear blocks. Pendent from the right extremities of the shift rods 34 and 35 are lock pins 54 and 55 which coact with diametrically opposite pairs of lock lugs 56 and 57 on the disk 52. These lugs are spaced to form central channels 58 and when the lock pins 54 and 55 are in circumferential alignment they ride through the channels 58 each time the lock lugs pass the pins during the rotation of the lock disk. But upon turning of the lever 41 to bend the disk tongues 32 and 33 prior to a gear shift the lock pins 54 and 55 will assume positions respectively in front of and at the rear of the lock lugs (Fig. 5) thereby preventing a reverse movement of the shift blocks 34 and 35 or a reverse turning of the shift lever 41 while the rollers 44 and 45 are traveling from one disk to the other. It is to be noted that the guide rods 42 and 43 are situated directly over the lock lugs and the locking function of the lugs 56 and 57 in respect to the rods 34 and 35 is therefore bound to occur while the rollers 34 and 35 travel over the split tongues from one disk to the other. In practice the lock pins 54 and 55 will be fitted with rollers so that there may be no unnecessary friction.

A speed change indicator provides a visual indication of the position of the gear blocks 46 and 47 within the case 1. The indicator comprises a dial 59 situated in some convenient place before the operator. The dial is stationary and is divided into segments 60, 61 and 62 with intermediate red segments 63. The dial is traversable by a pointer 64 carried by an indicator shaft 65 which extends through appropriate bearings into the transmission case 1 where it carries a pinion 66. The pinion meshes with the rack surface 67 of an indicator rod 68 that is appropriately guided at 69. The guide rod carries three studs 70. These studs are intended to run in the spaces 71 and 72 between the low, second and third speed gears 73, 74 and 75 of the blocks 46 and 47. The gears are split, this being the character of the blocks themselves, but when properly assembled constitute complete gears. The various positions of the studs 70 in respect to the gears are best seen in Figures 4 to 8 inclusive. The studs advance in respect to the gears as the progressively higher speed changes are made, each change turning the pointer 64 (Fig. 1) farther around the dial to keep the operator informed as to the particular speed in operation. The transmission shaft 9 has pinions 76, 77 and 78 corresponding with the various gears of the blocks 46 and 47.

The operation is now readily understood. Assume that the mechanism is adjusted for low gear or speed. Upon movement of the clutch lever 13 either forwardly or rearwardly the clutch 5 is made to engage either the driven gear 6 or the pinion 7 (Fig. 2) thereby causing either a forward or reverse motion of the vehicle by which the mechanism is carried. The free tongues 32 and 33 of the various track disks 23, 24 and 25 are in circumferential alignment making complete disks, so to speak. The gear blocks 46 and 47 are revoluble with the countershaft 2 and the rollers 44 and 45 are riding upon the low speed track disk 23. The tongues of the various disks are held in any given position by the shift rods 34 and 35 which have split pins 36 and 37 (Fig. 12) in which the various tongues are held. A movement of the shift lever 41 in the counterclockwise direction (arrow a, Fig. 3) will produce a forward movement of the rod 35 and a rearward movement of the rod 34 to such extent that the right tongues 33 are bent forwardly sufficiently far to meet the left tongues 32 which are bent rearwardly to agree and complete cross over tracks (see dotted lines, Fig. 3) from one disk to the other.

Figure 4 is a diagrammatic illustration of the parts while in low speed position. In Figure 5 the tongues 33 and 32 are shown bent as stated. The roller 44 has ridden half way up the cross over track and has partly shifted the gear block 46 in the direction of the intermediate speed position. By the time that the roller 44 has traversed the other half of the cross over track and has started to ride upon the second disk 24 the roller 45 will begin to ride upon the aforesaid cross over track for the purpose of correspondingly shifting the gear block 47. The block 46 will have reached its ultimate second speed position, and the block 47 will follow immediately thereafter so that the gear blocks assume the position in Figure 6. The gear 73 will no longer engage the pinion 76 but the gear 74 will be in engagement with the second speed pinion 77.

No interference of motion will occur at the transmission shaft 9 during the shifting of the blocks 46 and 47 between any of the three speeds. For example, while shifting from low to second speed the gear section 73 of block 47 will depart from the low speed pinion 76 at the same instant that the section 74 of block 46 engages the second pinion 77. The indicator rod 68 travels from the position in Figure 4 through the position in Figure 5 to the final position in Figure 6 at which time the second speed shift has been completed. During this travel of the rod, the indicator shaft 65 (Fig. 1) was turned to carry the pointer 64 across the first red segment 63 and onto the second white segment 61. The operator understands that while the pointer 64 is traversing the red segment he must make no attempt at shifting the lever 41.

These pins assume the position shown in Figure 5 upon shifting of the rods 34 and 35 by means of the lever 41 as already stated. As soon as the operator does that the pointer 64 has cleared the first red segment and has reached the second white segment 61 he may safely return the shift lever 41 to the original position thereby bending the tongues 32 and 33 back to the former circular formation. The lock pins 54 and 55 will then assume the former circumferential alignment and ride in the central channel 58 of the lock disk 52 when the lugs 56 and 57 pass. The foregoing actions are repeated when shifting from second to high speed, and inasmuch as the actions are the same a repetition of the description need not be given. The reader will understand that when the high speed position is assumed it will be the gear 75 that drives the transmission shaft 9 through the high speed pinion 78.

As stated before, the indicator is operated by the indicator rod 68 as the studs 70 move into the various spaces 71 and 72 as seen in Figures 4 to 8 inclusive. The studs get into the various spaces in this manner: When the gear block 46 is made to change in position from that illustrated in Figure 4 to that shown in Figure 6 by means of the passage of the roller 44 from low speed track 23 to intermediate speed track 24 the block moves forwardly with it, the rod 68 so that the stud 70 comes into alignment with and engages in the groove 71 of the gear block 47, when that block begins to cross over from low to intermediate. This block then moves said arm 68 forward with it to the position shown in Figure 6, where it remains until another shift is made. The foregoing process is then repeated, and the shift rod is made to assume the position in Figure 8. The same process occurs when shifting from high to low gear, although the motion will then be in the opposite direction. The back and forth travel of the rod 68 will turn the indicator shaft 65 with the obvious result.

In reference to the operation of the lock disk 52 in respect to the shift rods 34 and 35, it is intended to lock the shift rods only while the rollers 44 and 45 are immediately approaching, passing over or immediately leaving the cupped joints in the guide tracks so as to prevent the possibility of the rollers getting off of the tracks while the same are being shifted. Excepting as otherwise indicated, the shift rods can be moved at will, but such movement should not occur while the rollers are in the vicinity of the cup joint, it being then that the pairs of lugs on the lock disk function.

While the construction and arrangement of the improved speed change mechanism is that of a generally preferred form, obviously modifications and changes may be made without departing from the spirit of the invention or the scope of the claims.

I claim:—

1. Speed change mechanism comprising a continuously revoluble engine shaft, a counter-shaft continuously driven thereby, a transmission shaft having pinions, a gear block composed of sectional gears mounted upon and continuously driven by the countershaft, and means to alternately shift the gear sections to progressively advance the gear block along the countershaft to engage various ones of the transmission shaft pinions thereby to drive the transmission shaft at various speeds and shift from one speed to another without disconnecting the countershaft from the engine shaft.

2. Speed change mechanism comprising a continuously revoluble engine shaft, a countershaft continuously driven thereby, a transmission shaft having a plurality of pinions of different size, a pair of gear blocks carried by the countershaft including a plurality of gears of different size, and means to independently shift the gear blocks along the countershaft so that one of the gears of one block departs from a previously engaged pinion simultaneously with the engagement of another gear of the other block with another pinion thereby avoiding an interruption of the motion and permitting shifting from one speed to another without disconnecting the countershaft from the engine shaft.

3. Speed change mechanism comprising a continuously driven countershaft, a transmission shaft with pinions to be driven, split gears constituting blocks carried by the countershaft, supports carrying rollers extending from each of the blocks, and tracks upon which the rollers run thereby to hold the gear blocks in predetermined relationship with said pinions.

4. Speed change mechanism comprising a continuously revoluble countershaft, a transmission shaft having pinions to be driven, split gears carried by the countershaft constituting blocks, supports extending from said blocks carrying rollers, relatively stationary tracks in concentric arrangement on which said rollers run to hold said blocks in predetermined relationship and the gears thereof in alignment to mesh with certain pinions, and means to move portions of said tracks thereby to make connection from one track to another causing said rollers to cross over upon a succeeding track and shifting the blocks so that the gears thereof mesh with other pinions on the transmission shaft.

5. Speed change mechanism comprising a continuously revoluble countershaft, a transmission shaft having pinions to be driven, split gear blocks carried by the countershaft constituting complete gears when appropriately assembled to drive said transmission shaft, rollers supported upon said blocks, relatively stationary concentric tracks upon which said rollers run, thereby holding said blocks to complete the gears, flexible tongues included in said tracks, and means to so flex the tongues as to establish a cross over connection from one track to another causing the rollers to cross over and thereby set the blocks so that driving of the transmission shaft occurs through other combinations of gear and pinion.

6. Speed change mechanism comprising a continuously revoluble countershaft, a transmission shaft having pinions to be driven, a plurality of gear blocks carried by the countershaft, rollers carried by the gear blocks, a track assembly comprising alternate cylinders and track disks which have flexible tongues, shift rods having connection with said flexible tongues holding them in such manner as to keep the track disks in concentric relationship, so that the rollers may run upon any one thereof and keep the gear blocks in predetermined relationship with the pinions, and means to shift said rods thereby to flex the tongues and establish cross over connections from one track to another, said rollers thereby crossing over to another track and correspondingly shifting the blocks to establish another relationship thereof with said pinions.

7. Speed change mechanism comprising a countershaft, a transmission shaft having pinions to be driven, a carriage associated and revoluble with said countershaft, gear blocks mounted upon the carriage to mesh with the pinions, and means to first slide one of the blocks then the other upon the carriage along a countershaft to cause meshing of the gear blocks with the different pinion producing a different driven speed at the transmission shaft.

8. Speed change mechanism comprising a countershaft, a transmission shaft having pinions to be driven, a carriage mounted on and revoluble with the countershaft, split gears constituting gear blocks mounted upon the carriage, rollers carried by the gear blocks, a track assembly comprising alternating cylinders and track disks, flexible tongues included in said track disks, registering grooves in the cylinders and track disks providing continuous grooves along the track assembly, shift rods occupying said grooves and having means including pins holding said tongues, and means to shift the rods in opposite directions thereby to flex the tongues to such extent as to provide cross overs from one track to another causing a corresponding action of said rollers and a shifting action of said gear blocks in respect to the transmission shaft pinions.

9. Speed change mechanism comprising a countershaft, a transmission shaft having pinions to be driven, a carriage mounted on and revoluble with the countershaft, split gears constituting gear blocks mounted upon the carriage, rollers carried by the gear blocks, a track assembly comprising alternating cylinders and track disks, flexible tongues including in said track disks, registering grooves in the cylinders and track disks providing continuous grooves along the track assembly, shift rods occupying said grooves and having means including pins holding said tongues, means to shift the rods in opposite directions thereby to flex the tongues to such extent as to provide cross overs from one track to another causing a corresponding action of said rollers and a shifting action of said gear blocks in respect to the transmission shaft pinions, and means associated with said gear blocks providing a visual indication of the shifting of said blocks along the carriage.

10. Speed change mechanism comprising a countershaft, a transmission shaft having pinions to be driven, a carriage mounted on and revoluble with the countershaft, split gears constituting gear blocks mounted upon the carriage, rollers carried by the gear blocks, a track assembly comprising alternating cylinders and track disks, flexible tongues including in said track disks, registering grooves in the cylinders and track disks providing continuous grooves along the track assembly, shift rods occupying said grooves and having means including pins holding said tongues, means to shift the rods in opposite directions thereby to flex the tongues to such extent as to provide cross overs from one track to another causing a corresponding action of said rollers and a shifting action of said gear blocks in respect to the transmission shaft pinions, indicator means including a calibrated dial and pointer, and means to move said pointer across the dial to furnish a visual indication of the condition of said gear block, said means including an indicator rod, studs which are engageable with the gears of said blocks.

11. Speed change mechanism comprising a countershaft, a pair of blocks having gear sections forming complete gears when the blocks are in registration, a carriage revolving with the countershaft upon which the blocks are mounted, rollers carried by the gear blocks, a shiftable track assembly causing relative movement of the blocks along the carriage so that they may assume different registering positions therealong, and means associated with said carriage and track assembly preventing erroneous shifting of the track assembly during the period of relative movement of the blocks while performing a shift.

12. Speed change mechanism comprising a countershaft, gear blocks comprising gear sections making complete gears when the blocks are in registration, a carriage revoluble with the countershaft upon which the blocks are slidable, a lock disk constituting one terminal of said carriage and including pairs of lock lugs defining a central circumferential channel, rollers carried by the blocks, track disks upon which the rollers run including flexible tongues, shift rods to flex the tongues, providing cross overs from one track to another causing a corresponding action of said rollers and a relative shifting of said gear blocks so that they assume another registering position along said countershaft, and lock pins carried by said shift rods then assuming positions to the outside of said lugs, thereby preventing erroneous shifting of the rods while said tongues are flexed and said gear blocks are undergoing a shift.

WILLIAM M. MITCHELL.